United States Patent [19]

Faccou et al.

[11] 4,139,220

[45] Feb. 13, 1979

[54] SWIVEL JOINT SEALING SYSTEM

[75] Inventors: Armand L. Faccou, Santa Ana; Harold M. Gibbons, Long Beach, both of Calif.

[73] Assignee: FMC Corporation, San Jose, Calif.

[21] Appl. No.: 766,393

[22] Filed: Feb. 7, 1977

[51] Int. Cl.$^2$ .................... F16L 55/00; F16J 15/00
[52] U.S. Cl. ........................... 285/13; 285/47; 285/187; 285/276; 285/351; 285/DIG. 5; 277/16; 277/22
[58] Field of Search ............ 285/DIG. 5, 13, 14, 285/47, 187, 276, 351; 277/3, 16, 22, 65, 83

[56] References Cited

U.S. PATENT DOCUMENTS

| | | | |
|---|---|---|---|
| 964,578 | 7/1910 | Stephens | 285/276 |
| 1,861,132 | 5/1932 | Parsons | 277/22 |
| 1,873,267 | 8/1932 | Bigelow et al. | 277/22 |
| 2,061,198 | 11/1936 | Kohut | 285/139 |
| 2,531,079 | 11/1950 | Payne | 277/16 |
| 3,477,729 | 11/1969 | Hershey | 277/22 X |
| 3,775,989 | 12/1973 | Mursinna et al. | 285/DIG. 5 X |
| 3,884,511 | 5/1975 | Hermanson | 285/DIG. 5 X |
| 3,891,006 | 6/1975 | Lee | 285/47 X |

FOREIGN PATENT DOCUMENTS

| | | | |
|---|---|---|---|
| 678477 | 1/1964 | Canada | 285/DIG. 5 |
| 699586 | 12/1964 | Canada | 285/DIG. 5 |
| 742555 | 12/1955 | United Kingdom | 285/276 |

*Primary Examiner*—Robert S. Ward, Jr.
*Attorney, Agent, or Firm*—W. W. Ritt, Jr.; J. F. Verhoeven; C. E. Tripp

[57] ABSTRACT

A fluid conducting swivel joint is disclosed which has a sealing system effective against the leakage of fluids of extreme temperature. The joint consists of two housings mounted for relative rotation about an axis, the housings having a fluid passage therethrough. A first annular sealing chamber, having a seal therein, surrounds the passage, and is located adjacent the passage at the interface between the housings. Each housing has a radial flange at said interface, said flanges spaced apart to define an annular tempering chamber therebetween. A second annular sealing chamber, having a seal therein, is positioned between the flanges outboard of the tempering chamber. A temperature controlling chamber is mounted on one or both of said flanges. One of the housings may have an annular insulating chamber, and insulating members may be used to additionally insulate the second sealing chamber.

12 Claims, 6 Drawing Figures

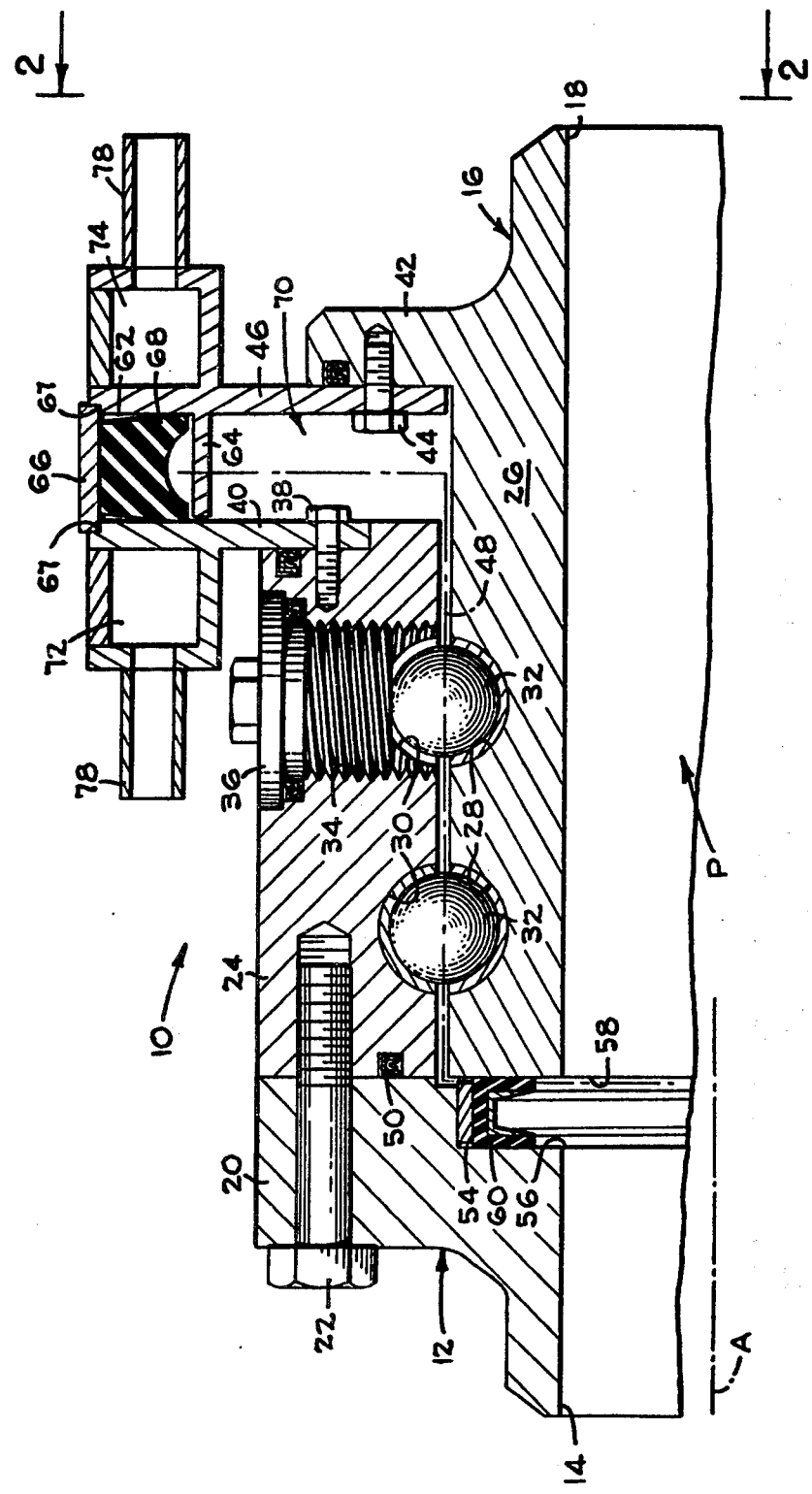
FIG_1

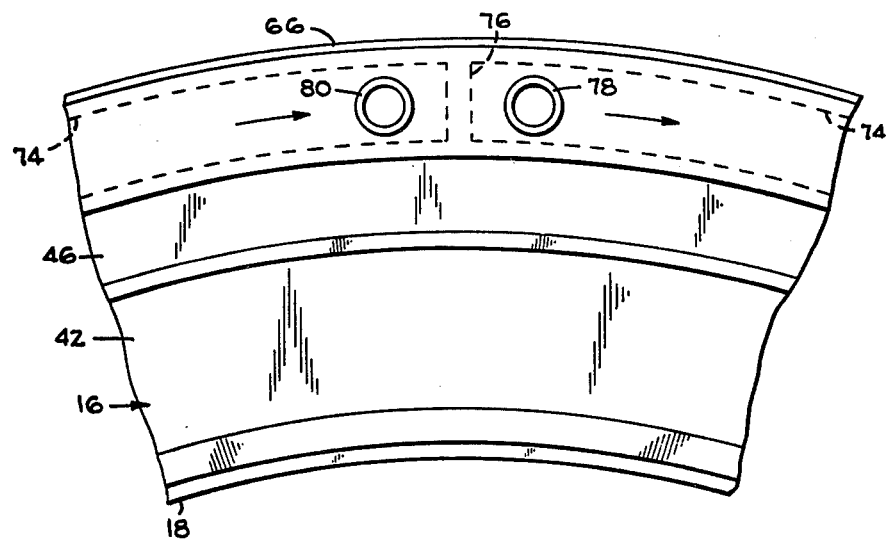
FIG_2
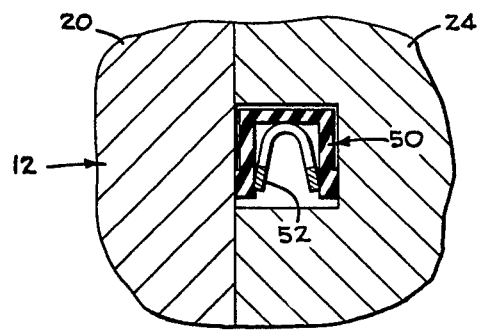
FIG_3

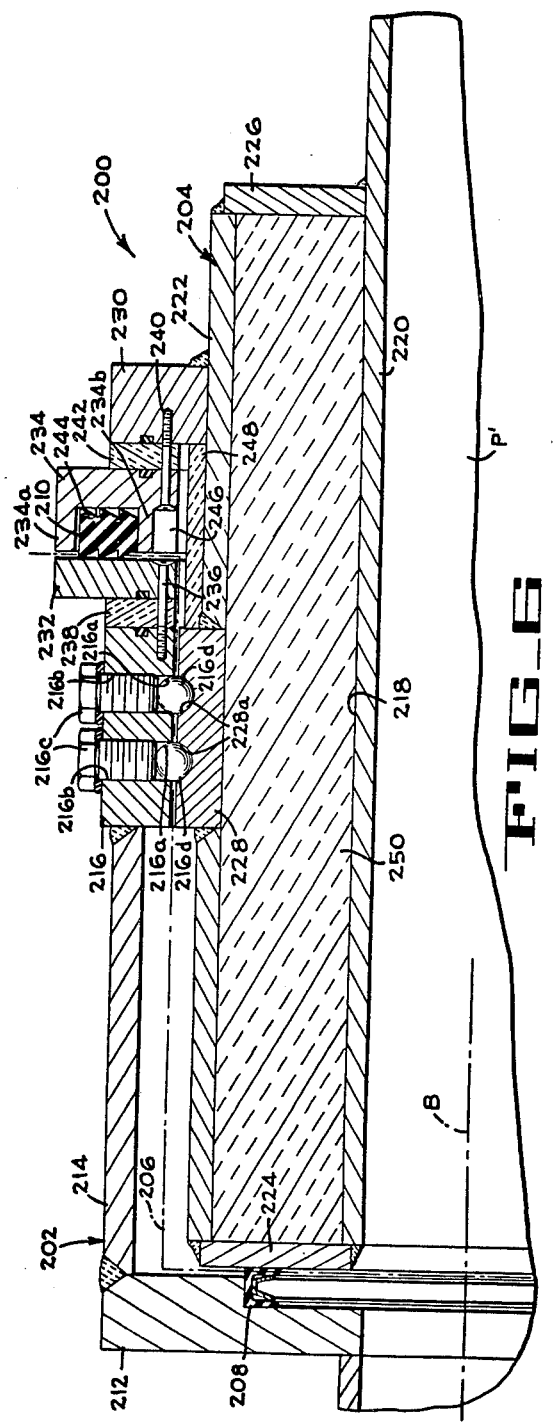

SWIVEL JOINT SEALING SYSTEM

BACKGROUND OF THE INVENTION

1. Field of the Invention

This application relates to sealing mechanism for a fluid conducting swivel joint and, more particularly, to sealing mechanism effective against leakage of fluids of extreme temperature.

2. Description of the Prior Art

A typical swivel joint consists of two housing sections which are rotatably mounted together and have a continuous fluid passage therethrough. Since the two housing sections must be capable of relative rotation, the two sections cannot be tightly secured at the interface, and as a result, a path is present at the interface through which fluid (either gas or liquid) can leak from the continuous passage. Consequently, it is conventional to provide a seal which engages both housing sections at the interface. Although the seal cannot press too tightly into a housing section which must be free to swivel, the seal is effective in the usual case to reduce the leak from the fluid passage.

A special problem is created when the fluid passing through the swivel joint is at an extreme temperature, either hot or cold. When the seal is exposed to extreme temperatures, its characteristics are changed to reduce its effectiveness and shorten its useful life. To minimize the effects of extreme temperature on the seals used in swivel joints, it is known to control the temperature of the seal by circulating a fluid such as cool air or a cooling fluid, as shown, for example, in the U.S. Pats. to Topping No. 2,127,073 and Phillips No. 2,356,351.

SUMMARY OF THE INVENTION

In the present invention, there is provided an effective sealing mechanism for a swivel joint through which fluids at extreme temperature flow. In one form of the invention, an annular seal is provided which is spaced from the passage through which the high or low temperature fluid passes. An annular temperature controlling chamber, or chambers, is mounted adjacent the seal spaced from the fluid passage to moderate the temperature of the seal. In the preferred form of the invention, two seals (one adjacent to, and one spaced from, the fluid passage) are positioned in the interface between the relatively rotatable housing sections, and a tempering chamber is located between these seals.

In another embodiment of the invention, an annular insulating chamber may surround the fluid passage, and insulating members may be used around the remote seal chamber to help prevent heat transfer.

It is therefore one object of the present invention to control more effectively the temperature of a seal in a fluid conducting swivel joint.

It is another object of the present invention to extend the life of a seal in a fluid conducting swivel joint.

It is yet another object of the present invention to control the temperature of the seal by isolating the seal from the main fluid passage.

It is still another object of the present invention to raise the temperature of the seal spaced from the fluid passage by introducing heat at the seal.

BRIEF DESCRIPTION OF THE DRAWINGS

FIG. 1 is a fragmentary view in cross-section of a swivel joint with a sealing system constructed in accordance with the present invention.

FIG. 2 is a view taken on the line 2—2 of FIG. 1.

FIG. 3 is an enlarged view of the static seals used between some parts of the swivel joint of FIG. 1.

FIG. 6 is a fragmentary view in cross-section of a swivel joint of another embodiment of the present invention.

DESCRIPTION OF THE PREFERRED EMBODIMENTS

Figure 4:
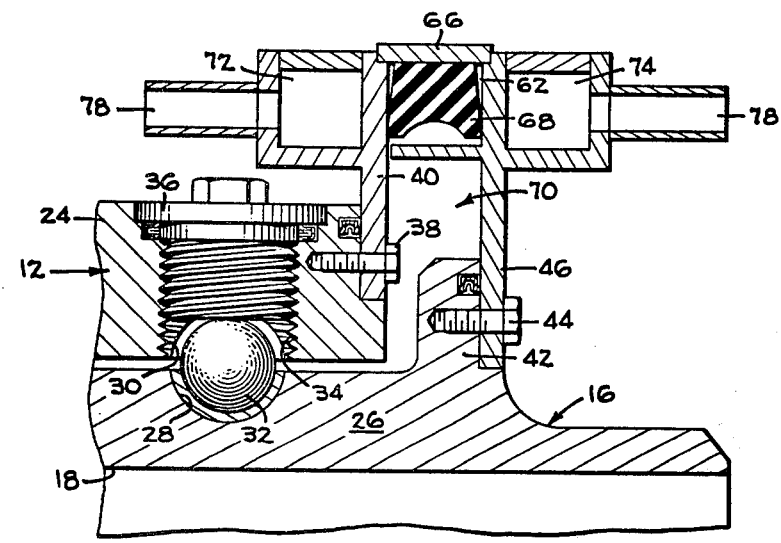
FIG. 4 is a fragmentary view in cross-section of a modified sealing system.

There is shown in FIG. 1 a fluid conducting swivel joint 10 constructed in accordance with the present invention. A first housing member 12 has a first passage portion 14 extending therethrough, and a second housing member 16 has a second passage portion 18 extending therethrough. The two passage portions 14 and 18 are aligned to form a continuous passage P (on an axis A) through the swivel joint to conduct fluid therethrough.

The first housing member 12 is cup-shaped and has an annular base 20. The base is connected by screws 22 to a circular wall 24. The second housing member has a cylindrical portion 26 which is received inside the circular wall 24 of the first housing member. Two external grooves 28 on cylindrical portion 26 align with internal grooves 30 on wall 24 to receive balls 32. Thus, by means of the balls 32, the first housing member 12 is mounted to the second housing member 16 for relative rotation (about axis A) between the housing members. Generally, one of the housing members (say, housing member 12 by way of illustration) is stationary and the other (housing member 16) is rotatable in housing member 12. Access holes 34 with removable plugs 36 are provided for each of the grooves 30 to feed the balls 32 into the grooves during assembly of the swivel joint.

The circular wall 24 of first housing member 12 has secured at its free end, by screws 38, a radial flange member 40 extending outwardly away from the passage P, normal to axis A. The second housing member 16 has a circular flange 42 to which is attached, by screws 44, a radial flange member 46 extending outwardly away from the passage P. The two flange members 40 and 46 are parallel and spaced apart in the axial direction. Thus, an interface 48 is defined between the stationary housing 12 and the rotatable housing 16 which extends between base 20 and the end of cylindrical portion 26, between circular wall 24 and cylindrical portion 26, and between the flange members 40, 46.

It should be noted that parts of a single housing, such as base 20 and wall 24 of housing 12, can be tightly secured together and sealed by a seal 50 (FIG. 3) with a strong biasing spring 52, to prevent leakage between the parts. The housings, however, cannot be tightly pressed together at the interface 48 since rotation must occur between the housings. Consequently, leakage from the passage P is most likely to occur along a path defined by interface 48.

A first annular seal chamber 54 is adjacent to, and surrounds, passage P. The chamber 54, which is on interface 48, is formed by a groove 56 in base 20, and by the end face 58 of cylindrical portion 26. A seal 60 in the seal chamber engages both the first housing member and the second housing member to bridge the interface 48. The seal 60 acts as a barrier which blocks most, but not all, of the fluid leakage from passage P. Thus a small amount of fluid will work its way along the interface between wall 24 of the first housing member and cylindrical portion 26 of the second housing member.

A second annular seal chamber 62 also encircles the passage P but is spaced therefrom. A first ring 64 is connected to one (46) of the flange members and extends into closely spaced relation to the other (40) flange member. A ring 66 of larger diameter fits loosely into corner notches 67 in the outer edges of flange members 40, 46. The rings 64, 66, together with the radial outer ends of flanges 40, 46, define the seal chamber 62 which receives a second seal member 68 therein. The seal member 68 engages both flanges to form a bridge between the first housing member 12 and the second housing member 16.

An annular chamber 70, which may be referred to (for reasons to be discussed hereinafter) as a tempering chamber, is defined by the ring 64, the outer surface of cylindrical portion 26, and spaced apart flanges 40, 46. It will be noted that the second seal chamber 62 and the tempering chamber 70 lie on the interface between the relatively rotatable housings.

An annular chamber 72, 74 is connected, respectively, to each of the flanges 40, 46, at their outer ends. The chambers 72, 74 (which, for reasons to be discussed hereinafter, may be referred to as temperature controlling chambers) are adjacent the seal chamber 62 and straddle that chamber. As shown best in FIG. 2, a barrier 76 is provided in each of the temperature controlling chambers 72, 74. An inlet tube 78 is provided for each chamber adjacent the barrier but on one side thereof, and an outlet tube 80 is provided for each chamber adjacent the barrier but on the other side thereof.

The sealing apparatus of the present invention is particularly suitable for a swivel joint through which passes liquified gases such as ethylene, methane, or nitrogen at cryogenic temperatures of −155° F. to −320° F. The seal 60, which may be considered a primary barrier seal, is adjacent the passage P and is exposed directly to the low temperature of the fluid in the passage P. Preferably, the seal 60, in order to withstand the cold temperatures, is made of "Kel-F" (a trifluorochlorethylene material made by 3M Company of Minneapolis, Minnesota) or "Teflon" (a fluorocarbon material made by DuPont Company of Wilmington, Delaware) which even at atmospheric ambient temperatures are quite rigid or hard as compared to rubber. Although these materials are durable at extreme low temperatures, they do not form a bubble-tight seal, and the seal 60 is not effective to completely block leakage of fluid past the seal.

The secondary seal 68 is made of an elastomer such as rubber which will effect a bubble-tight seal as long as the temperature of the seal material does not get colder than about −20° F. In order to assure that the elastomeric seal does not get too cold when cryogenic fluids are passing through the swivel joint, a jacket, or jackets, are positioned adjacent to the second seal chamber. These jackets are defined by the annular temperature controlling chambers 72 and 74 which straddle the seal chamber 62 in heat transfer relation. Any type of heated fluid such as steam, water, oil, or anti-freeze mixtures may be circulated through annular chambers 72, 74 by way of inlet 78 and outlet 80, as shown in FIG. 2.

The heat in the fluid circulated through channels 72, 74 is transferred through the flanges 40, 46 (which are as thin as possible in view of the loads carried to minimize heat transfer into the housing members 12 and 16) into the seal chamber 62 and seal 68. When the temperature of the seal is maintained above −20° F., the elastomeric seal 68 will effect a bubble-tight seal to prevent the leakage of fluid past the seal. Heating of the secondary seal 68 also could be accomplished by electrical means, such as heater strips instead of by fluid chambers.

The heat transfer from temperature controlling chambers 72, 74 through flanges 40, 46 also heats chamber 70. As the cold liquefied gas, which leaked past seal 60 and moves along the interface 48, enters the chamber 70, the liquid will gasify and the pressure in the chamber will rise. When the pressure in chamber 70 is in equilibrium with the pressure in passage P, leakage of fluid from the passage will cease. If the pressure in chamber 70 should exceed the pressure in passage P, gas in chamber 70 will bleed past the primary seal 60 into passage P.

It should be noted that the sealing system disclosed herein could also serve to effectively seal a swivel joint through which high temperature fluids passed. In that case, a cooling liquid would be circulated through temperature controlling chambers 72, 74 to keep the seal cool and prevent its deterioration from extreme high temperature.

The modification of FIG. 4 is identical to the modification of FIG. 1 except that in the former the flange 46 is connected to the outside of flange member 42 to facilitate removal of flange 46. In the arrangement of FIG. 4, the screws 44 are accessible for each removal. Since the annular chamber 74 is integral with flange 46, the removal of flange 46 will expose the seal 68 for easy replacement without separating the housing members 12 and 16.

Figure 5:
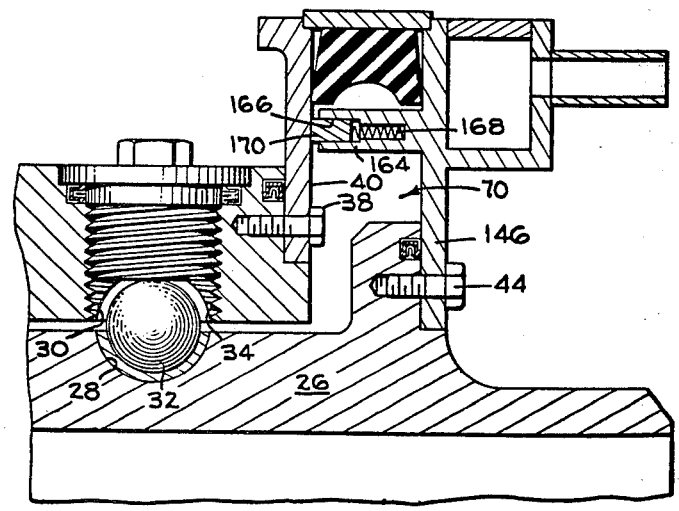
FIG. 5 is a fragmentary view in cross-section of yet another modification of the sealing system.

Another modification of the present invention is shown in FIG. 5. This modification is identical to the modification of FIG. 4 except that only one temperature controlling chamber 74 is utilized. The temperature controlling chamber 72 of FIGS. 1 and 4 has been omitted in the modification of FIG. 5. The flange 164 which forms the inner boundary of the second seal chamber is connected to flange 146 and has a groove 166 at its outer end which receives, in heat transfer relation, a ring 170. The ring 170 is biased into firm heat transfer relation with flange 140 by means of springs 168 received in the groove 166. Preferably ring 170 is made of a high heat conducting metal such as brass or aluminum.

In the embodiment of FIG. 6, a swivel joint 200, which can be used underwater, consists of two housing members relatively rotatable about an axis B: a first housing member 202 and a second housing member 204. One of the housing members (say, member 204) may be stationary and the other member 202 may be rotatable with respect to member 204. Since the two members must partake of relative rotation, they cannot be tightly pressed together at the interface 206 between the two members. Sealing members 208 and 210 are mounted at the interface, as to be described more fully hereafter, to prevent the escape of low or high temperature fluid from passage P' to the atmosphere, or to the sea.

The housing member 202 has an annular base portion 212, a cylindrical wall portion 214, and a ring member 216. The housing member 204 has an annular chamber 218 comprising an inner cylindrical wall portion 220, an outer cylindrical wall portion 222, and end annular wall portions 224 and 226. The outer wall portion includes a ring member 228 which is closely spaced to, but inside, the ring member 216. The inner ring member 228 has external ball grooves 228a, and the outer ring 216 has internal ball grooves 216a which are aligned with grooves 228a. Bores 216b in ring 216, which are normally closed by plugs 216c, are provided to supply balls 216d to the aligned grooves for relative rotation between housing members 202 and 204. The housing member 204 has a flange 230 secured to the outer wall 222.

Parallel flanges 232, 234 are connected, respectively, to housing members 202 and 204 between the block 216 of member 202 and the flange 230 of member 204. the annular flange 232 is connected by screw 236 to block 216 but is insulated therefrom by a ring of insulating material 238. The annular flange 234 is connected by screw 240 to flange 230 but is insulated therefrom by a ring of insulating 242.

Flange 234 has two spaced apart rings 234a and 234b integral therewith which define a seal pocket 244 between the flanges 232 and 234. A tempering chamber 246 is defined by the spaced apart flanges 232, 234, and this chamber is insulated from the cylindrical wall 222 of housing member 204 by a sleeve 248 of insulating material. The rings 238, 242 and the sleeve 248 can be made of micarta and silicone rubber, respectively.

The primary seal 208 is similar in every respect to the seal 60 and will not be discussed further. The secondary seal 210 is an elastomeric seal member which has an inverted Christmas tree shape to block the entry of sea water in underwater installations.

The chamber 218 is filled with insulation 250, or a vacuum is maintained therein, to insulate the secondary seal from the extreme temperature of the fluid (liquid or gas) flowing through passage P'. The insulating sleeve 248, tempering chamber 246, and the insulating rings 238, 242 help prevent any heat transfer between the fluid in passage P' and flanges 232,234, and thus seal 210.

Although the best mode contemplated for carrying out the present invention has been herein shown and described, it will be apparent that modification and variation may be made without departing from what is regarded to be the subject matter of the invention.

What is claimed is:

1. Sealing mechanism for a swivel joint of the type having a first housing to define a first passage portion, a second housing rotatably mounted to said first housing to define a second passage portion, said passage portions in communication to define a continuous passage, a first annular seal chamber surrounding the passage and positioned adjacent said passage between said housings, a first seal in said first seal chamber to block flow from said passage, the improvement comprising a second annular seal chamber surrounding said passage, said second seal chamber positioned between said housing and remote from said passage, a second seal in said second seal chamber to block the flow from said first seal chamber, and a temperature controlling chamber in heat transfer relation with said second annular seal chamber to control the temperature of the second seal therein.

2. Sealing mechanism for a swivel joint of the type having a first housing to define a first passage portion, a second housing rotatably mounted to said first housing to define a second passage portion, said passage portions in communication to define a continuous passage, the interface between said relatively rotatable housings constituting a path for the escape of fluid from said passage, a first annular seal chamber surrounding the passage and positioned adjacent said passage between said housings, a first seal in said first seal chamber to block flow from said passage, the improvement comprising a second annular seal chamber surrounding said passage and positioned remote from said passage between said housings, a second seal in said second seal chamber to block the flow from said first seal chamber, an annular tempering chamber in said path between said seal chambers, and an annular temperature controlling chamber in heat transfer relation with said second annular seal chamber to control the temperature of the secondary seal therein.

3. Sealing mechanism for a swivel joint of the type having a first housing to define a first passage portion, a second housing to define a second passage portion, said housings mounted together for relative rotation about an axis, said passage portions on said axis and in communication to define a continuous passage on said axis, the interface between said relatively rotatable housings constituting a path for the escape of fluid from said passage, a first annular seal chamber surrounding the passage and positioned adjacent said passage between said housings, a first seal in said first seal chamber to block flow from said passage, the improvement comprising a second annular seal chamber surrounding said passage and positioned remote from said passage between said housings, a second seal in said second seal chamber to block the flow from said first seal chamber, and a pair of annular temperature controlling chambers in heat transfer relation with said second annular seal chamber to control the temperature of the secondary seal therein.

4. Sealing mechanism for a swivel joint of the type having a first housing to define a first passage portion, a second housing to define a second passage portion, said housings mounted together for relative rotation about an axis, said passage portions on said axis and in communication to define a continuous passage on said axis, the interface between said relative rotatable housings constituting a path for the escape of fluid from said passage, a first annular seal chamber surrounding the passage and positioned adjacent said passage between said housings, a first seal in said first seal chamber to block flow from said passage, the improvement comprising a second annular seal chamber surrounding said passage and positioned away from said passage between said housings, a second seal in said second seal chamber to block the flow from said first seal chamber, an annular tempering chamber in said path between said seal chambers, and a pair of annular temperature controlling chambers in straddling relation to said second annular seal chamber and in heat transfer relation therewith to control the temperature of the secondary seal therein.

5. In a swivel joint of the type comprising a first housing and a second housing, said housings mounted for relative rotation about an axis and having a passage extending therethrough on said axis, the improvement comprising an outwardly extending flange on each of said housings, said flanges spaced apart in the axial direction, a seal mounted in sealing engagement with said flanges radially spaced from said passage, and a temperature controlling chamber on at least one of said flanges adjacent said seal to control the temperature of the seal.

6. In a swivel joint of the type having a first housing and a second housing adjacent thereto, said housings mounted together for relative rotation about an axis and having a passage extending therethrough on said axis, the improvement comprising a radial flange on each of said housings at the interface between the housings, said flanges spaced apart in the axial direction, a seal mounted in sealing engagement with said flanges radially spaced from said passage, and a temperature controlling chamber on each of said flanges adjacent said seal to control the temperature of the seal.

7. In a swivel joint of the type comprising a first housing and a second housing adjacent thereto, said housings mounted together for relative rotation about an axis and having a passage extending therethrough on said axis, a first annular seal chamber adjacent said passage on the interface between the housings, a first annular seal mounted in said first seal chamber, the improvement of a radial flange on each of said housings at said interface, a second annular seal chamber between said flanges spaced from said passage, a second annular seal mounted in said second seal chamber, and a temperature controlling chamber adjacent said second seal chamber and in heat transfer relation therewith.

8. A swivel joint of the type comprising a first housing and a second housing adjacent thereto, said housings mounted together for relative rotation about an axis and having a passage extending therethrough on said axis, a first annular seal chamber adjacent said passage on the interface between the housings, a first annular seal mounted in said first seal chamber, the improvement comprising a radial flange on each of said housings at said interface, an annular tempering chamber between said flanges, a second annular seal chamber between said flanges and outboard of said tempering chamber, a second annular seal mounted in said second seal chamber, and an annular temperature controlling chamber adjacent said second seal chamber and in heat transfer relation therewith.

9. A swivel joint of the type comprising a first housing and a second housing adjacent thereto, said housings mounted together for relative rotation about an axis and having a passage extending therethrough on said axis, a first annular seal chamber adjacent said passage on the interface between the housings, a first annular seal mounted in said first seal chamber, the improvement which comprises a radially extending flange on each of said housings at said interface, an annular tempering chamber between said flanges, a second annular seal chamber between said flanges and outboard of said tempering chamber, a second annular seal mounted in said second seal chamber, an annular temperature controlling chamber mounted on each of said flanges adjacent said second annular seal chamber, said temperature controlling chambers straddling said second seal chambers to control the temperature of the seal therein.

10. In a swivel joint of the type having a first housing and a second housing wherein said housings are mounted to each other for relative rotation about an axis, and wherein said housings have a passage extending through the housings on said axis, said swivel joint having an annular seal chamber at the interface between said housings and having a seal member mounted in said seal chamber, the improvement comprising an annular flange on each housing at said interface, said annular flanges spaced apart to define another seal chamber at the interface radially spaced from said passage, said seal chamber having a seal member mounted therein, and a temperature controlling chamber on at least one of said flanges in heat transfer relation with said another seal chamber.

11. In a swivel joint having a first housing member with a passage portion and a second housing member with a passage portion, said second housing member received in and mounted to said first housing member for relative rotation therebetween about an axis, said passage portions defining a continuous passage through said housing members and said housing members defining an interface therebetween, a pair of seal chambers at said interface, including a near seal chamber adjacent said passage and a remote seal chamber spaced from said passage, and a seal in each of said seal chambers, the improvement comprising an insulated annular chamber in said second housing member surrounding the passage portion thereof and interposed between said passage and said remote seal chamber, said insulated annular chamber including an annular outer axial wall with at least one outwardly facing rotatable bearing raceway for cooperation with an opposed inwardly facing bearing raceway and rollable bearing means to facilitate said relative rotation between said first and second housing members, and remote seal chamber means mounted on said annular outer axial wall of said insulated annular chamber for supporting a remote seal between said first and second housing members.

12. The apparatus of claim 11 including a flange connected to said first housing member and positioned to cooperate with said remote seal chamber means of said second housing member to define said remote seal chamber, and insulating means thermally isolating said remote seal chamber from said bearing raceways to block the transfer of heat therebetween.

* * * * *